W. C. STEWART.
SKIVING MACHINE.
APPLICATION FILED JUNE 11, 1917.

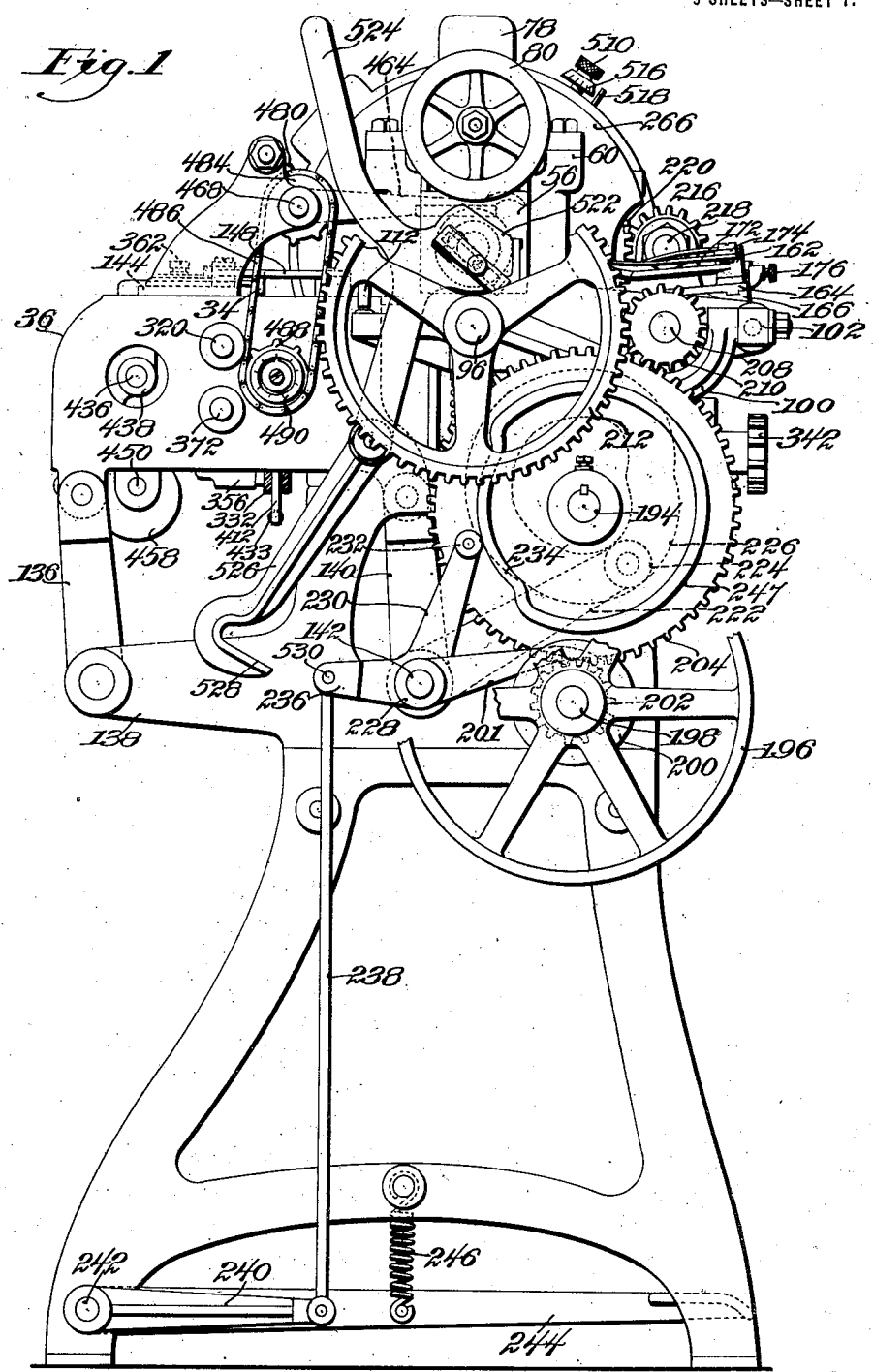

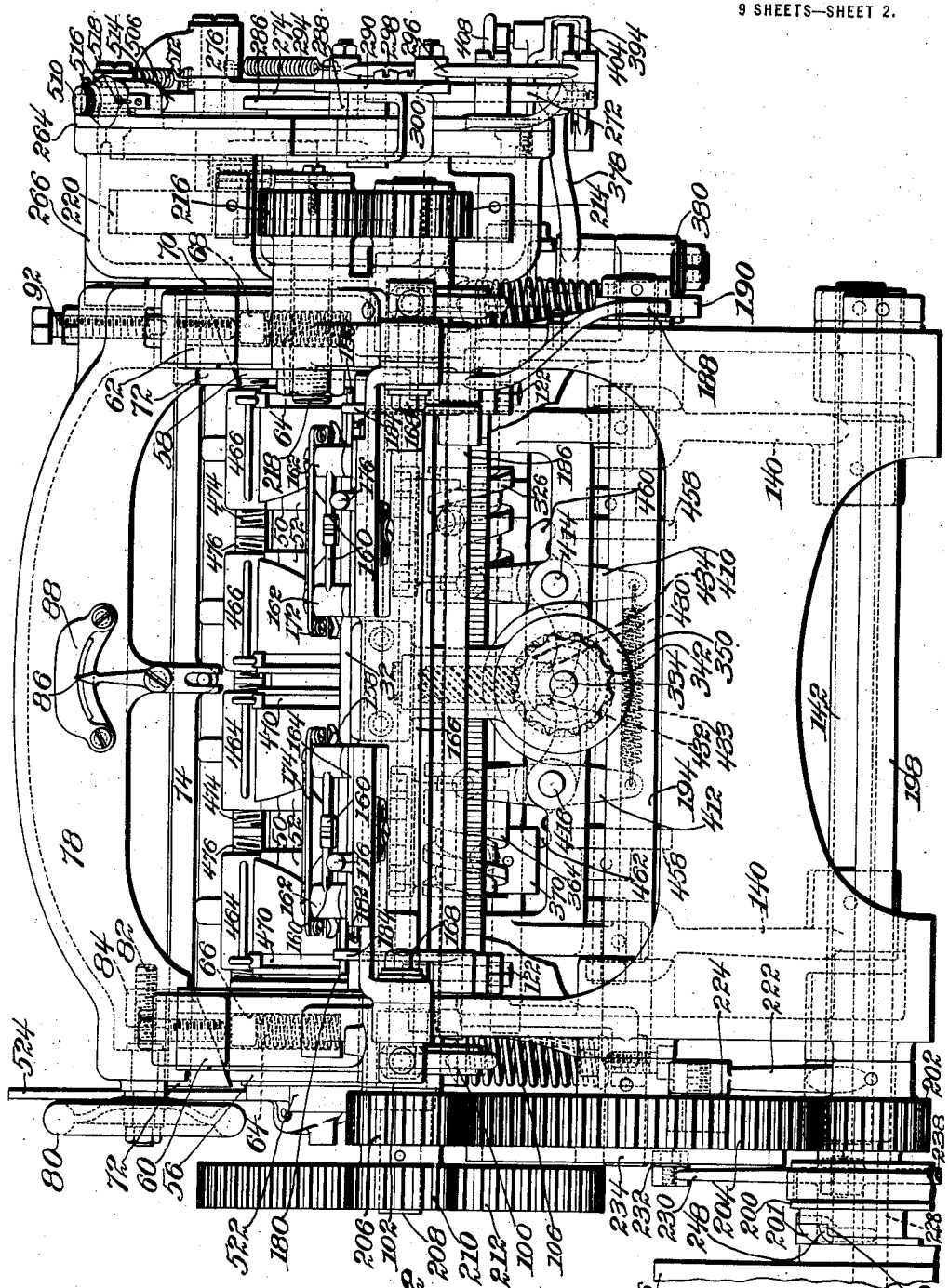

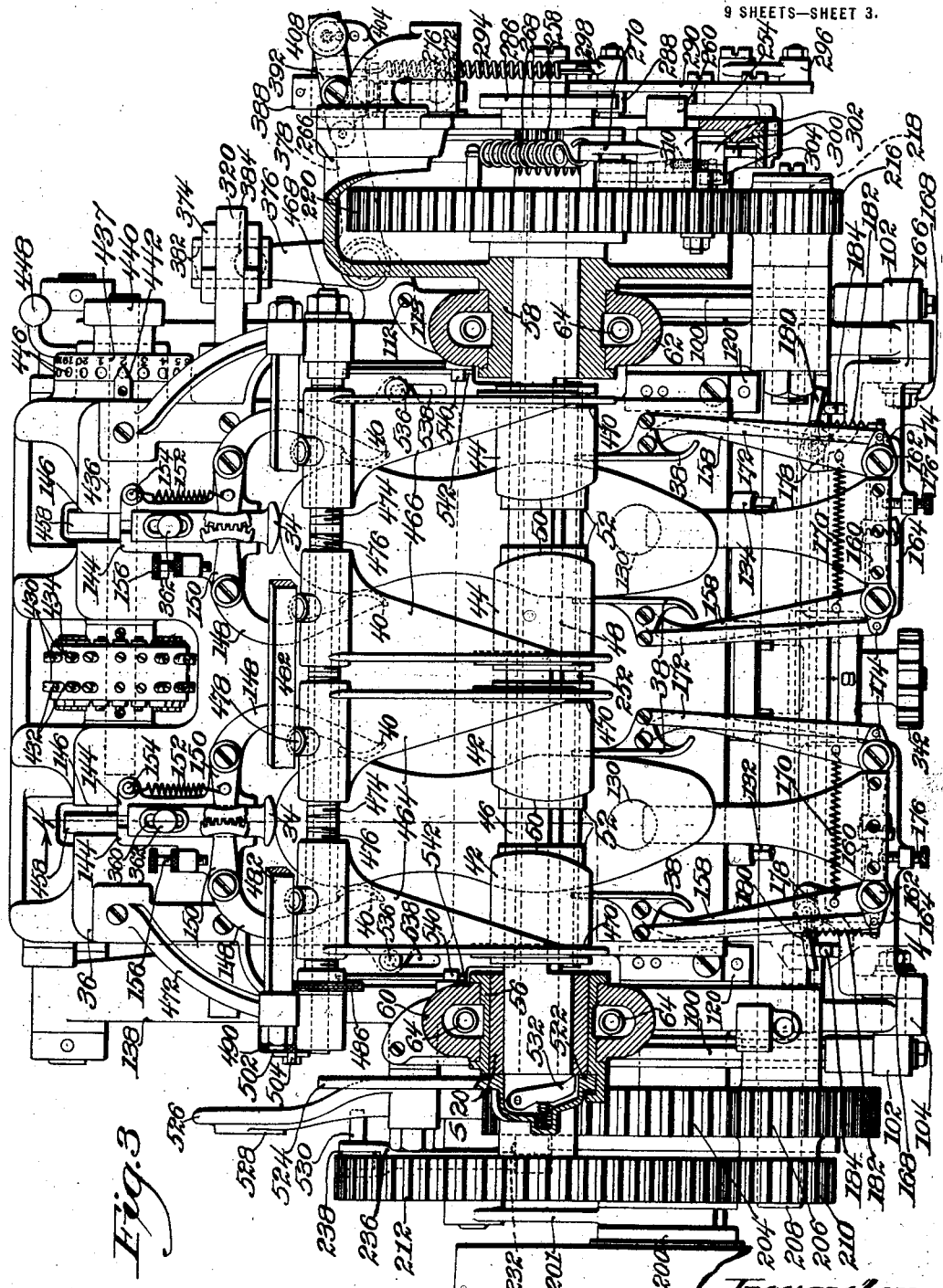

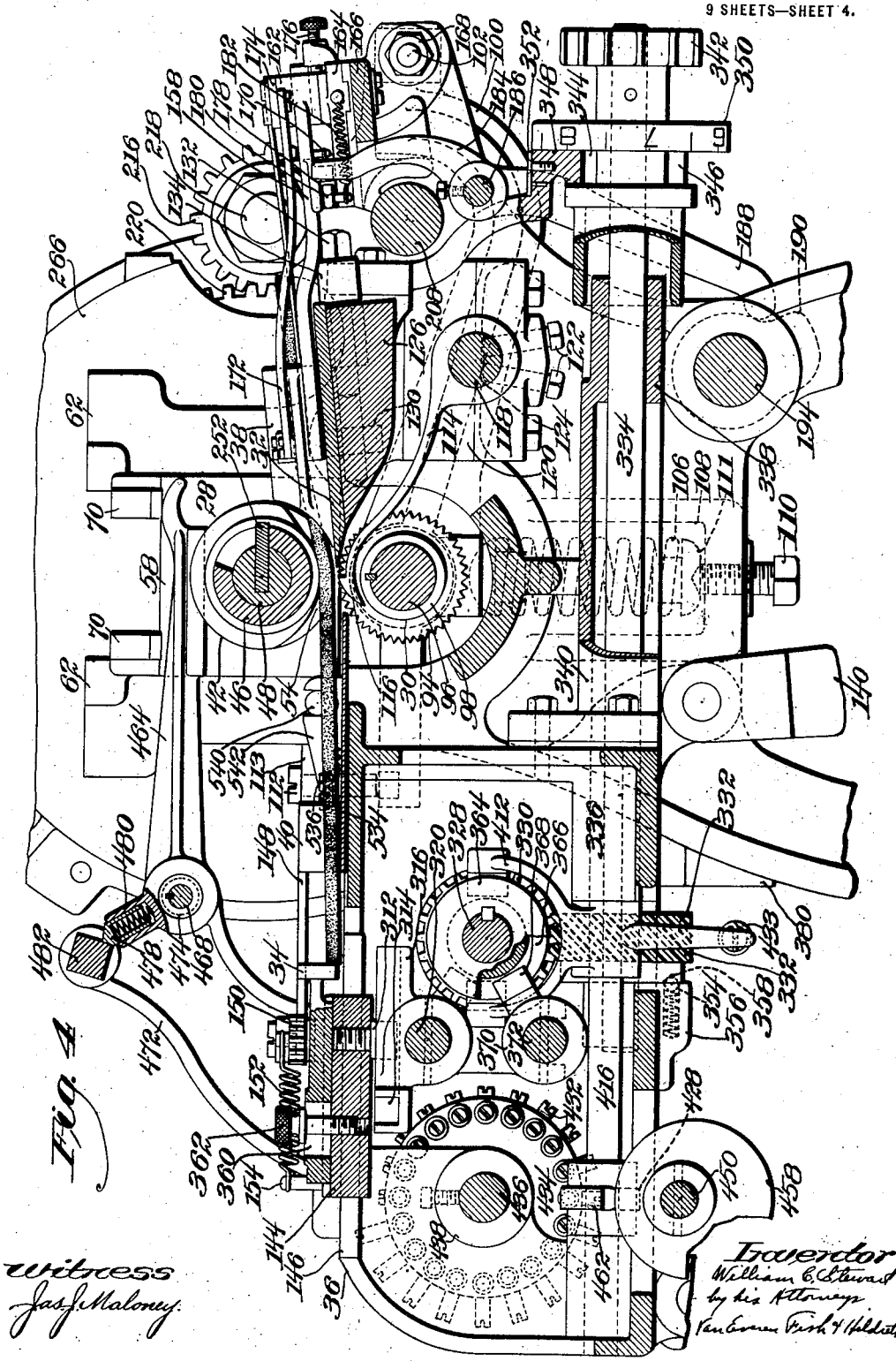

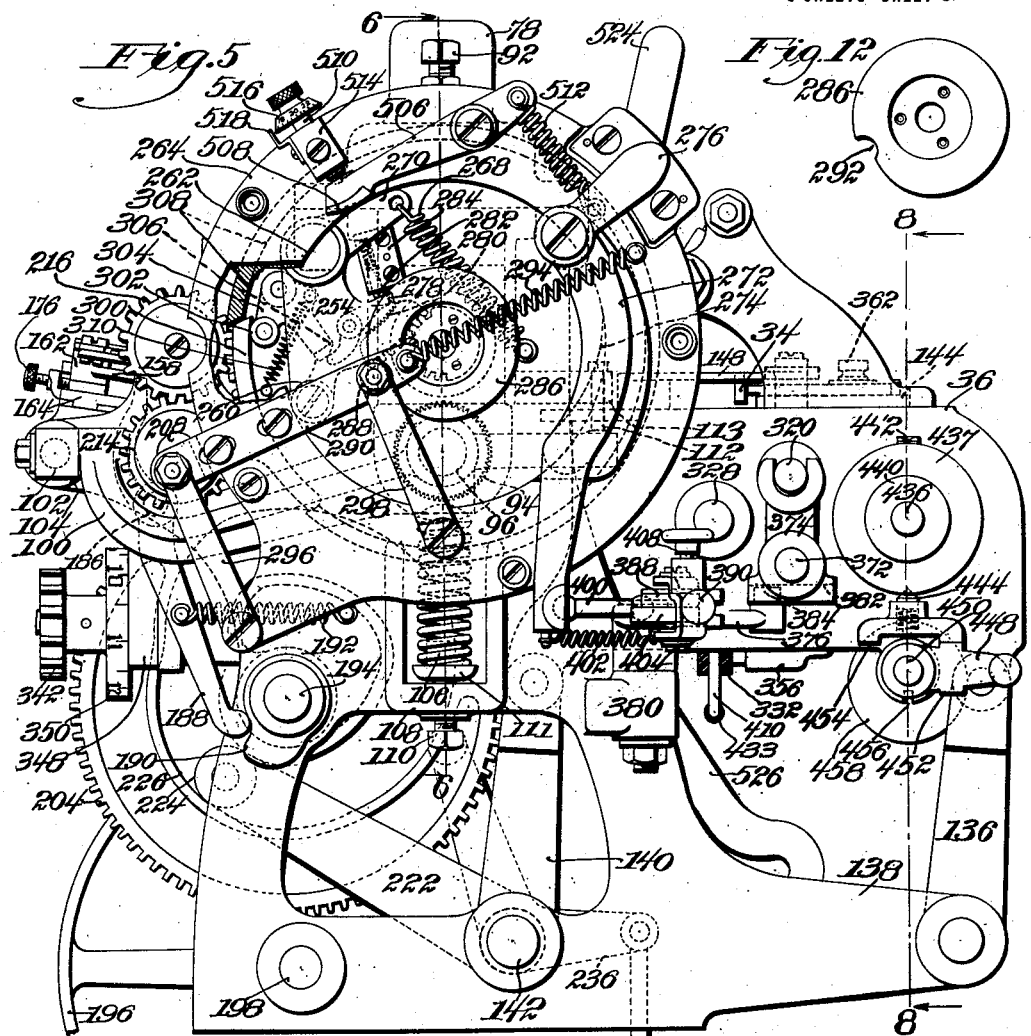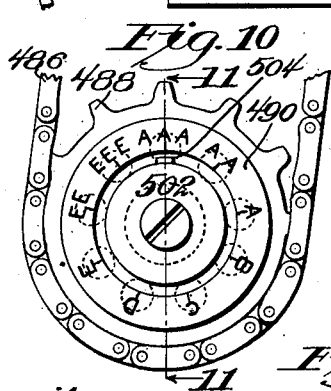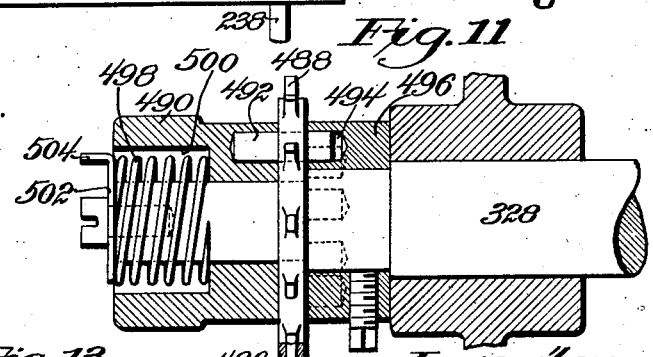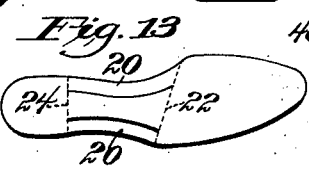

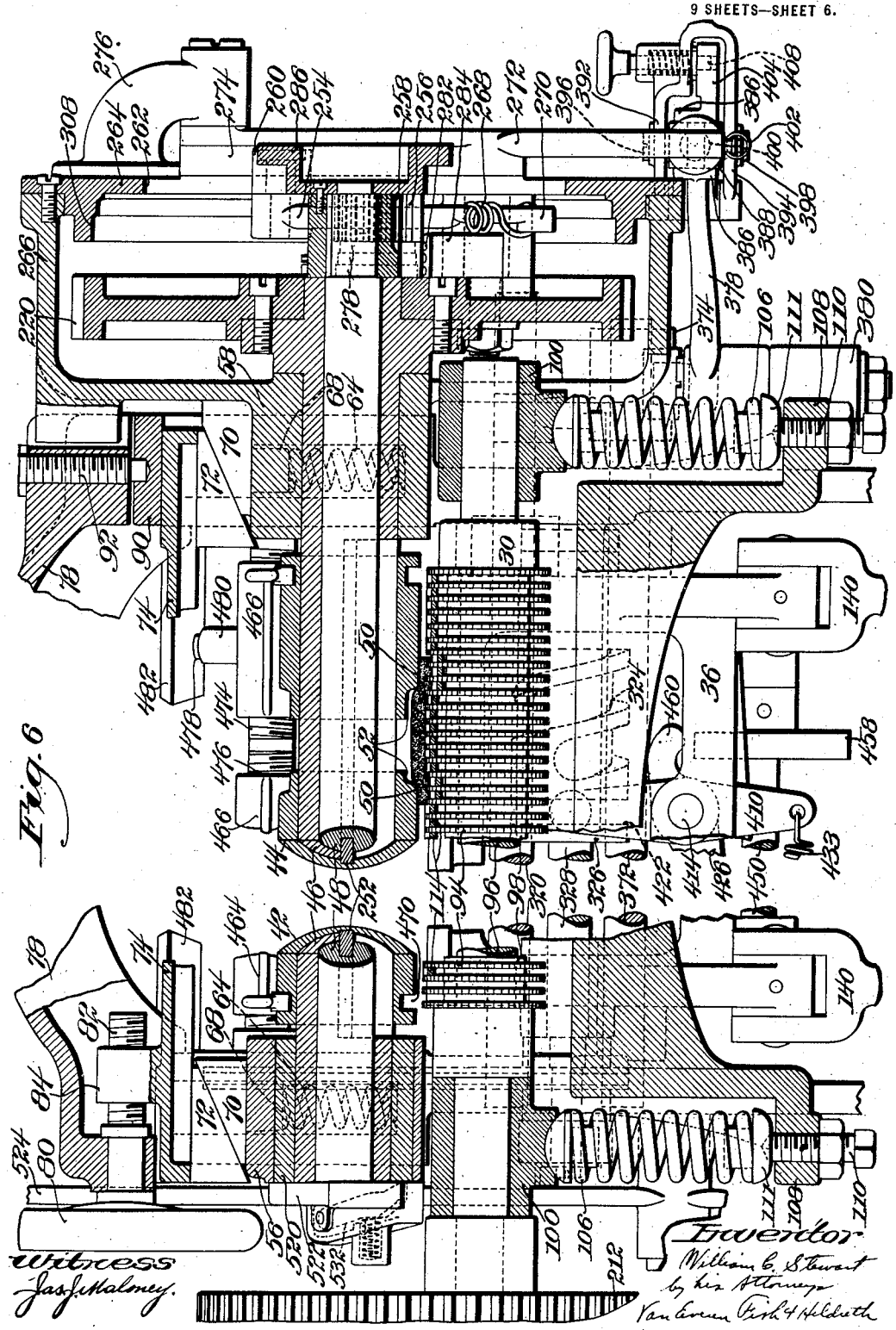

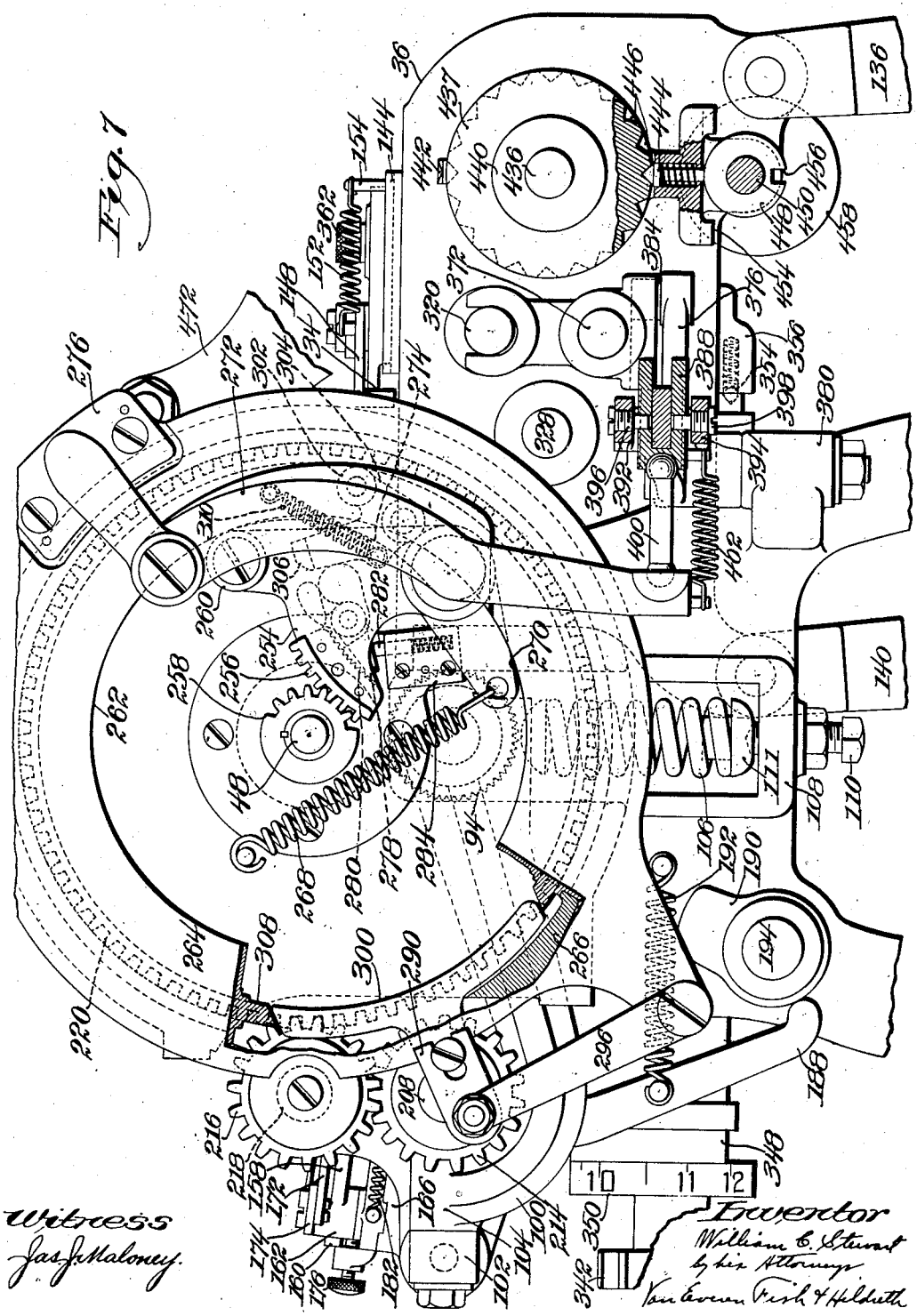
W. C. STEWART.
SKIVING MACHINE.
APPLICATION FILED JUNE 11, 1917.
1,382,689.
Patented June 28, 1921.
9 SHEETS—SHEET 7.

1,382,689.

Patented June 28, 1921.
9 SHEETS—SHEET 8.

Fig. 8

Witness
Jas. J. Maloney.

Inventor
William C. Stewart
by his Attorneys
Van Everen Fish & Hildreth

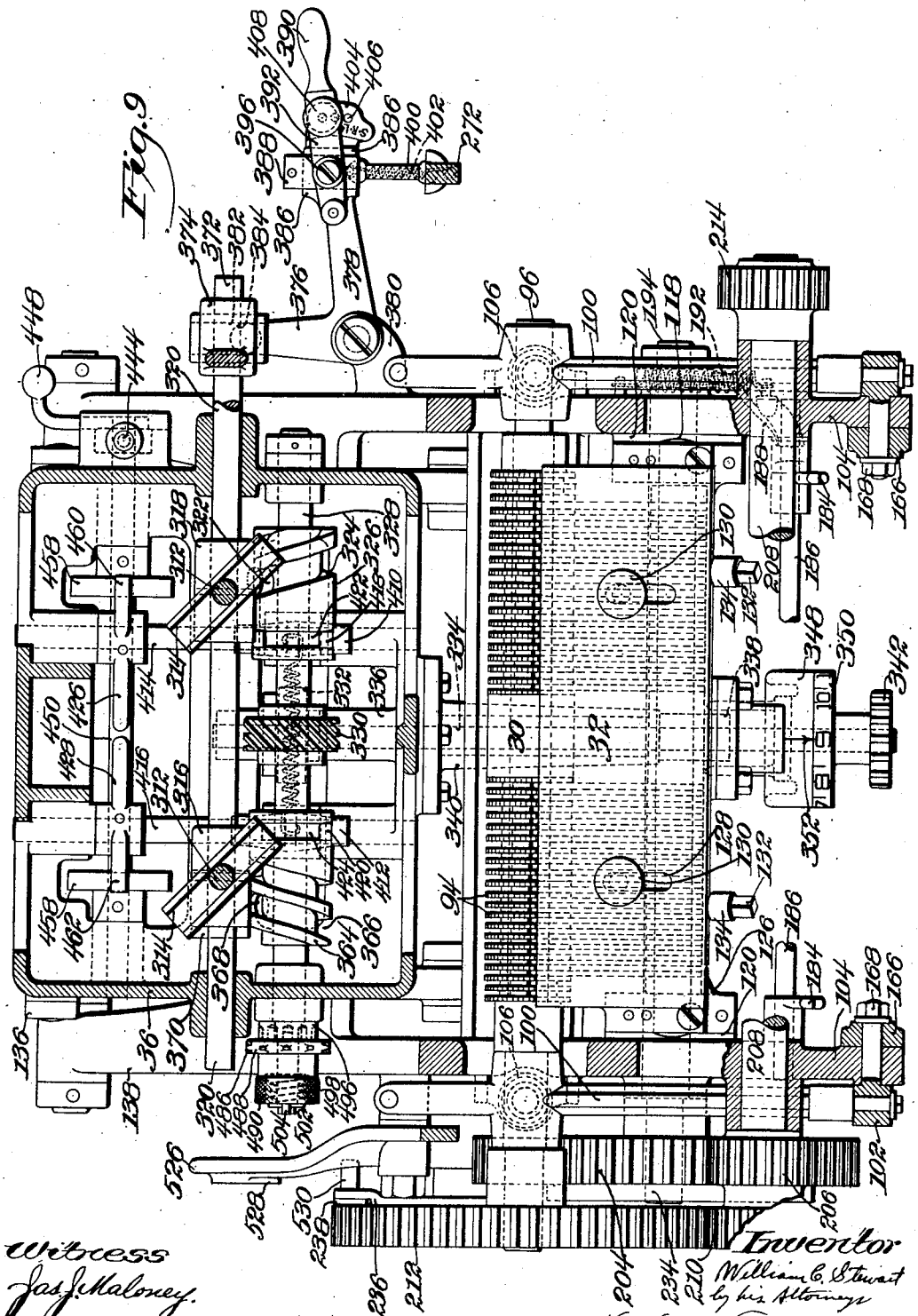

UNITED STATES PATENT OFFICE.

WILLIAM C. STEWART, OF SWAMPSCOTT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SKIVING-MACHINE.

1,382,689. Specification of Letters Patent. Patented June 28, 1921.

Application filed June 11, 1917. Serial No. 174,027.

*To all whom it may concern:*

Be it known that I, WILLIAM C. STEWART, a subject of the King of Great Britain, residing at Swampscott, in the county of Essex and State of Massachusetts, have invented certain new and useful Improvements in Skiving-Machines; and I do hereby declare the following to be a full, clear, and exact description of the invention, such as will enable others skilled in the art to which it appertains to make and use the same.

This invention relates to machines for operating upon soles, and more particularly to skiving machines for shanking out shoe soles.

In the manufacture of the better grades of shoes, the outsole is shanked out or skived on the flesh side of the shank portion of the sole at each side of the center to produce a thin edge and to allow the shank portion of the sole to be properly leveled. The skived portions should be confined to the shank or to the portion of the sole between the ball and breast lines; otherwise, the thin edge of the sole will extend into the forepart, or back into the heel seat and mar the appearance of the shoe sole. Heretofore it has been the usual practice to shank out shoe soles with machines in which the soles are guided past a rotary cutter by the operative. The location of the shank skivings with these machines depends entirely upon the skill of the operative. Since the shape of the shank portion of a shoe sole may vary with each of thirty different styles of shoes and three different heel styles of shoes, and since the shape of the shank of each of these styles may vary with each of thirteen sizes and eight different widths of shoes, it is apparent that the shank skiving can only be approximately located by the operative.

The primary object of the invention is to provide a skiving machine for shanking out shoe soles by which the skived portions may be accurately positioned on a sole.

In accordance with this object one feature of the invention contemplates the provision in a shoe blank skiving machine having a skiving knife, a pressure roll or device, and a die roll or matrix carrier having a matrix, of means to relatively move the blank and matrix during the skiving operation. To avoid the necessity of having a separate die roll or matrix carrier provided with a differently shaped matrix for skiving the soles of each of the different sizes of all the different styles of shoes the movement of the matrix relatively to the blank is varied in order to vary the character of skiving.

Up to the present time it has been found to be impracticable to use a die roll having a matrix for shanking out shoe soles because a die roll which has a sufficient circumferential length to operate on the full length of a sole must have such a large diameter that the cutting edge of the skiving knife can not be placed sufficiently close to the line of centers of the die and pressure rolls to skive properly. To overcome these objectionable features of a die roll machine a feature of the present invention contemplates the use of a die roll which has a circumferential length less than the length of the blank to be treated. The matrix of the die roll extends around a major portion of the roll and is controlled to be brought into operation upon the portion of the blank to be skived as the blank is fed between the die and pressure rolls.

Another feature of the invention contemplates the provision in a skiving machine having a skiving knife, a die roll and a pressure roll, of a matrix rotatably mounted on the die roll and means for controlling the movements of the matrix to bring the matrix into position on the sole to locate the skiving in the shank portion.

Another feature of the invention contemplates the provision in a skiving machine having a skiving knife, a pressure roll and a die roll, of a matrix adjustably mounted on said die roll and means to adjust the matrix axially of the die roll to vary the width of skiving. In the preferred embodiment of the invention an independent matrix is employed for operating on each side of the shank portion of the sole. These matrices are formed on sleeves which are axially adjustable toward and from one another to vary the width of skiving or to operate upon blanks of different widths.

Another feature of the invention contemplates the provision in a skiving machine having a skiving knife, a pressure roll, a die roll and means to rotate the rolls to feed a blank against the knife, of a matrix movably mounted on the die roll and shaped to position the blank to form cuts, the starting edges of which are located on a line extending at an angle to the line of feed, and means to relatively move the blank and matrix to vary the angle of said line to the line of feed. The matrix employed in the preferred form of the invention is shaped to start the shanking out cuts on the ball line of the sole, which line extends at an angle to the center line of the sole. By relatively moving the matrix and blank as the shanking out cuts are started the angle of the line in which the starting edges of the cuts are located may be varied so that the same matrix may be used for locating the starting cuts in the ball line of the sole of practically any of the different styles of shoes.

Another feature of the invention contemplates the provision in a machine for skiving shoe soles having a skiving knife, a pressure roll, a die roll and means for operating the rolls, of matrices mounted on the die roll for positioning right and left soles so that they may be simultaneously skived. Shoes are generally made in shoe factories in lots which consist of a certain number of pairs of shoes of different styles, sizes and widths. When the soles for lots of shoes come to the shanking out machine they are arranged in pairs of right and left soles and each pair is kept together after they have been skived. Right and left soles require the use of differently shaped matrices so that they have to be skived separately. By arranging separate matrices on the die roll for treating right and left soles, a pair of soles may be skived simultaneously and the various adjustments of the parts of the machine for positioning the soles and varying the character of skiving may be simultaneously made. This simplifies the skiving operation and greatly increases the output of the machine.

A further feature of the invention contemplates the provision in a machine for skiving shoe soles having a skiving knife, a pressure roll, a die roll and means to rotate the rolls to feed a sole against the skiving knife, of a matrix rotatably mounted on the die roll, mechanism to relatively move the sole and matrix during the skiving operation, an end gage for positioning the sole with relation to the matrix and devices for simultaneously adjusting the end gage and matrix moving mechanism. By coördinately adjusting the end gage and the mechanism for moving the matrix to vary the character of skiving, the machine may be quickly adjusted for treating the soles of different kinds of shoes with the use of a small number of calibrated adjusting devices.

A further feature of the invention contemplates the provision in a skiving machine having a skiving knife, a pressure roll, and a die roll, of a matrix sleeve mounted on the die roll, an open bearing for one end of the die roll, a bushing removably mounted in the bearing to permit the removal of the matrix sleeve and means for holding the bushing in said bearing arranged to prevent operation of the machine when the parts are not properly assembled in the bearing.

Another object of the invention is to provide novel and improved means in a machine for operating upon soles for positioning the sole on the work support.

Another feature of the invention contemplates the provision in a machine for operating upon soles of means for positioning a sole on the work support, comprising a pair of gages for engaging opposite edges of the sole, which gages are carried by a pair of pivotally mounted arms that extend from their pivots in the direction that the work is moved by the operator to the operating instrumentalities of the machine, and means is provided for yieldingly urging the gages toward each other and for causing the gages to move in unison. With this construction it will be apparent that as the work is moved between the gages it will exert a force in a direction away from the pivots resulting in the gages spreading and adjusting themselves freely to the contour of the sole.

While the features of the present invention are well adapted for use in a skiving machine, it is to be understood that except as defined in the claims certain features of the invention are not limited to use in a machine of this type.

In addition to the features of invention above referred to the present invention also consists in certain features of construction and combinations of parts hereinafter described and claimed, the advantages of which will be obvious to those skilled in the art from the following description:

The various features of the invention are illustrated in the accompanying drawings in which Figure 1 is a view in side elevation of the left hand side of a shanking-out machine embodying the preferred form of the invention; Fig. 2 is a front elevation of the upper portion of the machine; Fig. 3 is a plan view of the machine shown partly in section; Fig. 4 is a vertical sectional view of the machine taken on the line 4—4 of Fig. 3; Fig. 5 is a view in side elevation of the upper portion of the right hand side of the machine; Fig. 6 is a vertical sectional view of the machine taken on the line 6—6 of Fig. 5; Fig. 7 is a view similar to Fig. 5 showing the mechanism for moving the matrix sleeve relatively to the die roll in a different position from that shown in Fig. 5; Fig. 8 is a view in rear elevation of the upper part of the machine with parts shown in section taken on the line 8—8 of Fig. 5; Fig. 9 is a sectional plan view of the machine showing the skiving knife and the heel gage adjusting mechanism; Fig. 10 is a detail view in side elevation showing the sole width adjusting dial; Fig. 11 is a vertical sectional view of the sole width adjusting dial taken on the line 11—11 of Fig. 10; Fig. 12 is a detail end view of the matrix sleeve stopping cam; and Fig. 13 is a diagrammatic view of an outsole showing the shape and position of the shanking out cuts.

The machine illustrated in the drawings is adapted for skiving the flesh side of outsoles to remove portions of leather from each side of the shank as shown at 20—20 in Fig. 13 of the drawings. The skived portions extend between the ball line 22 and the breast line 24, and the inner edges of the skivings are approximately parallel with the edge of the sole. The machine comprises a die roll provided with projections forming a matrix having the shape of the skivings to be removed, and with a cavity between the projections having the shape of the unskived portion of the shank of the sole, a feed roll for holding the sole against the matrix and for forcing the sole into the cavity, and a skiving knife having its cutting edge located at approximately the line of contact of the rolls with the sole. Between the skiving operations the die and pressure rolls stand at rest with the matrix on the die roll away from the feed roll so that an opening between the rolls is provided to permit a sole to be placed between the rolls by hand and positioned for the skiving operation. The sole is positioned longitudinally by means of a heel gage which is mounted on a sole feeding carriage and is positioned transversely by a set of breast line gages located on the sole feeding carriage at the rear of the die roll and by a set of ball line gages located on the frame of the machine at the front of the die roll. The breast and ball line gages remain in contact with the sole as it is being skived and tend to maintain the transverse alinement of the sole. When the die and pressure rolls are set into operation the sole feeding carriage is simultaneously moved to advance the sole between the rolls at approximately the speed of rotation of the rolls. The die roll is controlled to bring the matrix into contact with the shank portion of the sole and when the matrix has clamped the sole against the pressure roll the carriage stops and is returned to its starting position. After the matrix has completed its operation upon the sole the sole is free so that it may be removed from the machine. The die and pressure rolls make one complete revolution and stop with the matrix in a predetermined position preparatory for the next skiving operation. To position the different kinds of soles with reference to the matrix, the heel gage is adjustably mounted on the sole feeding carriage and is arranged to have its position corrected by adjusting devices calibrated in accordance with the dimensions of soles of different styles and of different sizes of shoes. The die roll comprises a cylindrical roll on which is rotatably mounted a set of matrix carrying sleeves for operating on right soles and a set of matrix carrying sleeves for operating on left soles. The circumferential length of the matrix sleeves, as well as that of the pressure roll, is shorter than the length of the sole, and the matrix projections which extend around the major portion of the sleeves are shaped for operating upon the longest shank of the largest size of sole to be treated. To vary the character of skiving produced on soles of different sizes or styles, the sleeves are connected with a cam operated mechanism to accelerate the rotation of the sleeves relatively to the die and feed rolls, to move the matrix relatively to the sole during the skiving operation. The cam operated mechanism for rotating the sleeves is connected with the calibrated adjusting devices of the heel gage so that the position of the operating cam will be corrected for operating on soles of different styles and sizes of shoes when the heel gage is adjusted. The operating cam is also provided with an adjusting device calibrated to correct its position for operating on soles of shoes of different heel styles. The leading edges of the matrix projections are so arranged with relation to each other that the starting edges of the shank cuts will be located in a line extending at an angle to the line of feed, which angle, in case the matrix is moving at the same speed as the blank when the shank cuts are started, will be the most acute angle required in forming the ball line of a sole of any of the different styles of shoes. To vary the angle of the ball line formed by the matrix projections when skiving soles of different styles of shoes, the matrix is moved relatively to the soles as the skiving cuts are being started. The matrix sleeves are adjustable axially of the die roll to vary the width of the skiving or to position each set of sleeves for operating on soles of shoes of different widths. Each set of matrix sleeves is connected with an adjusting device which is calibrated to correct the position of each sleeve of the set for operating on soles of different widths. Since the width of shanks varies in soles of different sizes of shoes, the matrix sleeve adjusting mechanism is connected with the size adjusting device to correct the position of the sleeves for operating on soles of different sizes of shoes.

In the machine illustrated in the drawings, 28 indicates the die roll, 30 the pressure roll, 32 the skiving knife, 34 the heel gage, 36 the sole feeding carriage, 38 the ball line side gages in front of the die roll, 40 the breast line side gages at the rear of the die roll, 42—42 the set of matrix sleeves on the die roll for operating on right soles, and 44—44 the set of matrix sleeves on the die roll for operating on left soles.

The die roll, indicated generally by the numeral 28, comprises a roll 46 rotatably mounted on a shaft 48 (Figs. 3, 4, and 6), and the sets of matrix sleeves 42 and 44 which are rotatably mounted upon the roll 46. Each set of matrix sleeves is provided with matrix projections 50—50 which are shaped to position the sole for skiving portions 20—20 (Fig. 13), and cavities 52—52 inside of the matrix projections 50 for positioning the central portion of the sole lying between the skived portions 20—20 (see Fig. 6). The matrix projections 50 extend around the major portion of the matrix sleeves, and a cavity 54 (Fig. 4) is formed on the portion of the surface of each sleeve which is not occupied by the matrix projection. The cavities 54 are positioned opposite the feed roll when the rolls are at rest to permit removal and insertion of soles for skiving. The die roll is journaled in bearings 56—58 which are vertically adjustable in forks 60—62 (Figs. 3 and 4) formed at opposite sides of the upper portion of the machine frame. The forks are recessed at opposite sides of the bearings to provide seats for compression springs 64 upon which are mounted lugs 66—68 (Fig. 6) projecting from the front and the rear of the bearings 56 and 58 respectively. The springs normally force the die roll upwardly away from the skiving knife, and to determine the position of the die roll with relation to the skiving knife, wedge blocks 70 are formed on the upper side of the bearings 56 and 58 which are engaged by adjusting blocks 72 carried by a bar 74. The bar 74 is arranged to be moved longitudinally to move the adjusting blocks 72 between the wedge blocks 70 and a cap plate 78 connected between the forks 60 and 62, to vertically adjust the die roll. To move the bar 74 a hand wheel 80 is fixed in the cap plate 78 and has a shank 82 threaded into a lug 84 formed on the bar 74. When the hand wheel 80 is operated to adjust the position of the die roll with relation to the skiving knife to produce different thicknesses of sole edge, the position of the die roll is indicated by a pointer 86 (Fig. 2), which moves over the face of a calibrated dial 88. To maintain the surface of the die roll parallel to the skiving knife a plate 90 (Fig. 6) is mounted on the bar 74 above the bearing 58 and arranged to be adjusted vertically by means of a bolt 92 mounted in the cap plate 78.

The feed roll 30 consists of a series of toothed disks 94 which are keyed to a shaft 96 and spaced apart by a series of washers 98. The shaft 96 is journaled in hangers 100 (Figs. 4, 5 and 9) which are located at opposite sides of the machine frame below the die roll bearings 56 and 58. The forward ends of the hangers are pivotally connected by pins 102 and lugs 104 projecting forwardly from the sides of the machine frame. The rearward ends of the hangers are supported on compression springs 106 mounted between the lower face of the hangers and the bracket 108 formed at each side of the machine frame below the feed roll shaft. The springs 106 normally force the feed roll upwardly to press a sole against the die roll and the pressure of the feed roll upon the sole is controlled by means of adjusting bolts 110 which are mounted in the brackets 108 and bear against bases 111 which engage the lower ends of the springs. The normal elevation of the feed roll by the springs 106 is determined by stop screws 112 (Figs. 5 and 8) which are mounted in lugs 113 on the machine frame in position to contact the rearward ends of the hangers 100.

To assist the feed roll in pressing the sole against the die roll a series of pressing fingers 114 (Fig. 4) are positioned between the disks 94 on the feed roll with their sole engaging faces 116 approximately flush with the ends of the teeth on the feed disks. The pressing fingers 114 are locked in position on a rod 118 which is rotatably mounted in blocks 120 formed on the inner face of the opposite sides of the machine frame. A pair of adjusting screws 122 are threaded in each of the blocks 120 and bear upon flat faces 124 formed on a portion of the rod 118 which projects into the blocks 120. By means of the adjusting screws 122 the position of the pressing faces of the fingers 114 may be varied to vary the pressure of the fingers against the sole. Since the shanks of the pressing fingers 114 extend into the space between the feed disks 94 they serve to strip the waste skivings from the teeth of the feed disks.

The skiving knife 32 (Figs. 4 and 9) consists of a flat blade which rests on a bed plate 126 mounted between the opposite sides of the machine frame on the blocks 120. The knife is adjustably secured to the bed plate by means of slots 128 and bolts 130, and its cutting edge is adjusted with relation to the line of centers of the die and feed rolls by means of bolts 132 which are threaded into the front face of the bed plate and have collars 134 arranged to engage the rear edge of the skiving knife.

The sole feeding carriage 36 (Figs. 1, 4, 5 and 9) consists of a box like structure having top, bottom and side walls and is movably supported on a series of links with its upper face substantially in line with the skiving knife. The supporting links 136 (Figs. 1 and 5), connected to the lower side of the rear end of the carriage, are pivoted to brackets 138 which project rearwardly from the machine frame. The supporting links 140, which are connected to the lower side of the front end of the carriage, are pinned to a shaft 142 (Figs. 2 and 8) which is journaled between opposite sides of the machine frame. The heel gages 34 are mounted upon slide blocks 144 (Figs. 3, 4 and 8) which are arranged to slide between guides 146 formed in the upper face of the carriage 36. When the carriage is oscillated on the links 136 and 140 the heel gages 34 are moved with the carriage and serve as abutments to push the soles between the die and pressure rolls.

The breast line gages 40 for transversely positioning the heel end of the sole (Figs. 3 and 4) consist of a pair of plates, to engage the opposite edges of a sole immediately behind the breast line, which are secured to the rearwardly extending arms 148 of bell crank levers 148—150. The bell crank levers are pivotally mounted on the heel gage slide blocks 144, and the arms 150 of the levers project inwardly from the pivots and are provided with intermeshing gear segments by which the gages will be moved toward and from one another to position the sole with reference to the center line of the heel gage. The gages are normally moved toward one another by means of tension springs 152 which are connected between an arm 150 of one of the bell crank levers and a pin 154 in the slide block 144. Stop screws 156 are mounted in the slide blocks 144 and arranged to engage the rear face of an arm 150 of the bell crank levers to limit the approaching movement of the breast line gages for treating different sizes of soles so that a particular size of sole may be readily inserted between the gages without requiring any excess movement of them. Since the breast line gages are mounted on the sole feeding carriage they will move forwardly with the carriage in advancing a sole between the die and feed rolls and hold it in transverse alinement.

The ball line gages 38 for transversely positioning the toe end of the sole (Fig. 3 and 4) consist of plates to engage the opposite edges of a sole at approximately the ball line, which are pivotally mounted on forwardly extending arms 158 of bell crank levers 158—160. The bell crank levers 158—160 are mounted on pivots 162 which are secured in gage blocks 164 (Figs. 1 and 4) mounted upon a bar 166. The bar 166 extends between opposite sides of the machine frame and is held in position on the hanger supporting pins 102 by nuts 168. The inwardly projecting arms 160 of the bell cranks 158—160 are provided with intermeshing gear segments by which the gages will be moved toward and from one another in unison for centering the sole. The ball line gages are normally moved toward one another by means of tension springs 170 which are connected between the arms 158 of the bell crank levers. The ball line gage plates are elongated so that they may be used for centering all of the different lengths of soles and are arranged to be held in parallel alinement so that all of the soles of different styles of shoes will be similarly positioned. With the gage plates in parallel alinement, also, the plates will engage the opposite edges of a sole at points which substantially coincide with the ends of the ball line of the particular sole being positioned, and the sole will be positioned so that the center of the ball line will coincide with the center line of the positioning gages. To hold the gage plates in parallel alinement irrespective of the position of the gages, the links 172 are pivoted at one end to the gage plates and at the other end to a plate 174 mounted on the pivots 162. Stop screws 176 are mounted in the gage blocks 164 and arranged to bear against an arm 160 of the bell crank levers 158—160, to limit the inward movement of the ball line gages so that a sole of a particular size of shoe may be readily inserted between the gages without requiring an excess movement of them. The ball line gages are arranged to be locked in the position which they assume in transversely centering a sole so that while the sole is being skived the parallel gage plates will act to hold the sole in proper transverse alinement. As the sole is pushed between the gages toward the heel gage the ball line gages are spread apart in centering the sole and locked and when the heel end of the sole is against the heel gage only the inside edge of the sole is against the inner ball line gage plate (Fig. 3), because the ball line of the sole is located at the rear of the die roll before starting the skiving operation. To lock the gages, shoulders 178 (Figs. 3 and 4) are formed on the lower faces of the outer arms 158 of the bell crank levers which are engaged by clamping latches 180 pivoted on the gage block 164. The faces of the latches in engagement with the shoulders are eccentric to the pivotal mountings of the latches, and tension springs 182, connected between the latches and pins in the gage block 164, tend to clamp the eccentric faces against the shoulders as the gages are moved apart, to prevent movement of the gages under the action of the springs 170. The gages are released to the action of the springs 170 after the completion of the skiving operation by means of tripping levers 184 (Figs. 3 and 4) which engage the latches and rotate them to release the eccentric faces of the latches from the shoulders 178. The levers 184 are fixed on a shaft 186 which is journaled between opposite sides of the machine frame below the ball line gages. To operate the tripping levers a cam lever 188 (Figs. 4, 5 and 7) is secured to the shaft 186 and its lower end is held in engagement with a surface cam 190 by means of a tension spring 192 which is connected between the cam lever and the frame of the machine. The cam 190 is fixed on the right hand end of a cam shaft 194, (Fig. 2) which is journaled between opposite sides of the machine frame below the shaft 186. The shaft 194 and cam 190 are rotated in timed relation to the rotation of the die roll to trip the clamping latches immediately after the completion of the skiving operation so that when the skived sole is removed, the ball line gages will approach each other under the action of the springs 170 until the arms 160 come into engagement with the stop screws 176 to set the gages ready for centering a new sole.

The die and pressure rolls normally stand at rest and when they are set into operation they make one revolution to skive one pair of soles and then stop while the skived soles are being removed and a new pair of soles inserted. The driving power is received by a driving pulley 196 (Figs. 1 and 2) which is loosely mounted on a driving shaft 198 journaled between opposite sides of the machine frame. The pulley 196 is arranged to be connected and disconnected from the well known type of pin clutch 200, which is mounted on the shaft 198, by means of a wedge lever 201. A gear 202 is pinned to the shaft 198 and meshes with a cam gear 204 mounted on the cam shaft 194. The cam gear meshes with a gear 206 which is pinned to one end of a shaft 208 which extends across the front of the machine frame. A gear 210 formed integral with the gear 206, meshes with a driving gear 212 fixed on the feed roll shaft. A gear 214 is pinned to the end of the shaft 208 opposite the gear 206 and meshes with a gear 216 loosely mounted on a stud shaft 218. The gear 216 meshes with a gear 220 which is secured to one end of the die roll 46. The gears 212 and 220 have the proper diameter to impart the same peripheral speed to the die and pressure rolls and the gears 206, 210, 214 and 216 have the same diameter, the gear 216 being interposed between the gears 214 and 220 to rotate the die roll in the opposite direction to the rotation of the feed roll. To oscillate the blank feeding carriage 36 in timed relation to the operation of the die and pressure rolls a cam lever 222 is pinned to the shaft 142 and has a roll 224 which engages a path cam 226 formed on the inner face of the cam gear 204 (Figs. 1, 2 and 5).

The clutch 200 is arranged to be automatically disconnected from the pulley 196 to stop the die roll in a predetermined position ready for skiving a new sole. To this end the wedge lever 201 is formed on a sleeve 228 which is loosely mounted on the shaft 142. A cam lever 230 is formed on the sleeve 228 and has a cam roll 232 which engages a surface cam 234 (Fig. 1) formed on the outer face of the cam gear 204. An arm 236 formed on and projecting rearwardly from the sleeve 228 is connected by a rod 238 with a link 240 which is secured to a shaft 242 journaled in the base of the machine frame. A treadle lever 244 is fixed on the shaft 242 and is normally held in elevated position by means of a tension spring 246 which is connected between the treadle lever and the machine frame. The spring 246 holds the cam roll 232 against the cam 234 and normally acts to hold the wedge lever 201 in position between the clutch 200 and driving pulley 196, to disconnect the clutch from the driving pulley. When the treadle is depressed the cam roll 232 will be moved away from the cam 234 and the wedge lever 201 will be raised to permit the clutch 200 to be connected with the driving pulley to set the machine into operation. While the die and feed rolls are rotating the cam roll 232 rides on a concentric portion 247 (Fig. 1) of the cam 234 which holds the lever 201 above the clutch 200. After the cam gear 204 has made the major portion of a revolution the cam roll 232 passes into a depression in the cam 234 which permits the wedge lever 201 to be forced between the clutch 200 and pulley 196 by the spring 246, and at the time the cam gear 204 has completed a revolution, a shoulder 248 (Fig. 2) on the lever 201 engages a shoulder 250 on the clutch 200 to stop the rotation of the die and pressure rolls at a predetermined point.

To avoid the use of a large number of different matrices for skiving soles of the different styles, heel styles and sizes of shoes, the matrix sleeves are arranged to be rotated relatively to the die roll during the skiving operation so that the character of shanking out cuts formed by one set of matrices may be varied to form the shanking out cuts of soles of most of the different kinds of shoes. The matrix projections 50 are shaped for skiving the shanks of soles for the largest size of shoe to be treated, and to shorten the length of the skiving the matrix sleeves are accelerated relatively to the speed of the die and pressure rolls. As indicated in Figs. 4 and 6 the roll 46 has approximately one-fourth of its circumference cut away in the portion upon which the matrix sleeves are mounted to receive a key 252 by which the shaft 48 and sleeves 42 and 44 are locked together. To rotate the matrix sleeves relatively to the roll 46 a segment lever 254 is pivotally mounted on the die roll driving gear 220 (Figs. 5, 6 and 7) and has a segment 256 which meshes with a gear 258 keyed on the end of the shaft 48. A cam roll 260 is mounted on the segment lever 254 which is arranged to ride on a track 262 as the segment lever is rotated with the gear 220. The track 262 is concentric with the shaft 48 and constitutes the inner edge of a cover plate 264 which is secured to the outer face of a casing 266 (Fig. 6) formed integrally with the die roll bearing 58. The cam roll 260 is held in contact with the track 262 by means of a tension spring 268 which is connected between the gear 220 and an arm 270 formed on the segment lever 254. When the roll is in contact with the track 262 the matrix sleeves 42 and 44, the roll 46 and shaft 48 move in unison. During a portion of the revolution of the segment lever 254 the cam roll 260 travels over the face of an adjusting cam 274 which forces the roll toward the center of the gear 220 and oscillates the segment lever 254 on the gear, to thereby rotate the gear 258 and shaft 48 and accelerate the sleeves relatively to the die roll. The cam 274 is formed on the rear face of a cam lever 272, which is pivoted to a bracket 276 secured to the cover plate 264 in such a manner that the cam will move across the face of the plate 264 adjacent the track 262. The upper end of the cam surface lies in the pivotal axis of the cam lever 272 and forms a continuation of the track 262 and as the cam lever is moved toward and from the center of the die roll, the cam will extend a greater or less extent across the track 262 to vary the movement of the segment lever on the gear 220 and thereby vary the character of skiving. The roll 260 travels on the cam 274 for only a small portion of the revolution of the die roll, and to prevent the spring 268 from forcing the roll 260 back against the track 262 after the roll leaves the cam, three locking pawls 278 (Fig. 6) are pivoted to the gear 220 and arranged to engage a ratchet 280, secured to the inner face of the lever 254. The pawls are held in locking engagement with the ratchet by means of spring pressed plungers 282 which are mounted in a block 284 secured to the gear 220.

When the matrix sleeves are accelerated they complete a revolution before the die roll, and in order to set the matrices in a predetermined position ready to operate on a new blank they are stopped after they have made a complete revolution and the die roll continues to rotate until it has completed a revolution. A stopping cam 286 is secured to the gear 258 so as to rotate with the shaft 48 and when the matrix sleeves have made a complete revolution a roll 288 (Fig. 3) mounted on the rear face of a stopping rod 290 is snapped into a depression 292 in the cam 286 (Figs. 5, 6 and 12) by a tension spring 294 which is connected between the stopping rod and the cover plate 264. The locking rod 290 is supported upon a pair of links 296—298 which are pivoted to the plate 264 so that the rod is freely movable along the plate. At the time the roll 288 enters the depression 292, the segment lever locking pawls 278 are released from the ratchet plate 280 to permit the segment lever to move relatively to the gear 220 so that the die roll may move while the matrix sleeves remain at rest. To this end a tripping cam 300 secured to the locking rod 290 is arranged to be moved into engagement with a cam roll 302 on a tripping lever 304 when the stop rod 290 is moved to stop the cam 286 and bring a lug 306 on the tripping lever into engagement with the tails of the pawls 278 to release the segment lever. The tripping lever 304 is pivoted to the gear 220 and the roll 302 is held in contact with a track 308 formed on the inner face of the cover plate 264 by means of a tension spring 310 which is connected between the lever 304 and the gear 220. While the roll 302 is riding on the track 308 the lug 306 on the lever 304 does not engage the pawls 278 so that the pawls are free to lock the segment lever in any position into which it may be moved by the adjusting cam 274. The tripping cam 300 is adjustably secured to the locking rod 290 and projects within the casing 266 to form a section of the track 308. When the roll 288 is riding on the concentric portion of the stopping cam 286 the inner face of the tripping cam 300 is moved out to form a continuation of the track 308 and it is only when the roll 288 enters the depression 292 that the tripping cam is moved toward the center of the gear 220 to move the tripping lever 304 into position to release the pawls 278 from the segment lever. The movement of the stopping cam 286 is variable with relation to the gear 220 in skiving different kinds of soles so that the tripping cam 300 is elongated to insure that it will engage the roll 302 irrespective of the different positions occupied by the cam 286 and gear 220. The engagement of the roll 288 with the depression 292 does not serve as a rigid lock to hold the cam 286 from rotation but at the time the roll enters the depression, the matrices have passed off of the sole and the sleeves are free so that the spring 294 gives sufficient pressure on the roll to stop the cam. After the cam 286 has stopped, the continued rotation of the gear 220 will permit the segment lever to move relatively to the gear until the roll 260 on the segment lever comes into engagement with the track 262 at which time the gear 220 will have made a complete revolution and will be stopped through the clutch.

The matrices are shaped to position the sole so that the starting edges of the skiving cuts are on the ball line of the sole. The distance from the ball line to the heel end of the sole varies for soles of different sizes of shoes so that the position of the heel gage must be corrected for positioning soles of different sizes of shoes to have the ball line of the different soles coincide with the starting cuts formed by the matrices. To adjust the heel gages, pins 312 are mounted in the lower faces of the slide blocks 144 (Figs. 4, 8 and 9) and arranged to project into diagonal grooves 314 formed in the upper faces of blocks 316 and 318 which are pinned to a shaft 320. The shaft 320 is slidably mounted in bearings formed in the opposite sides of the feed carriage 36 and as the shaft is moved in the bearings the heel gages will be shifted in the direction of the line of feed. To move the shaft 320 a pin 322 projects from the lower side of the block 318 into a spiral groove 324 formed on the periphery of an adjusting cylinder 326 splined on an adjusting shaft 328 which is journaled between opposite side walls of the carriage 36. A worm gear 330 fixed on the shaft 328 meshes with a worm 332 which is splined on a size adjusting shaft 334. The size adjusting shaft is journaled in a bearing 336 (Fig. 4) formed on the bottom of the carriage 36 and in a bearing 338 formed in the bracket 340 which is secured to the front wall of the carriage. A hand-wheel 342 is pinned to the forward end of the shaft 334 and is provided with an annular groove 344 (Fig. 4) which enters a slot 346 formed on the lower end of a bracket 348 secured to the front face of the skiving knife bed plate 126. When the carriage 36 is moved forwardly in advancing a sole, the bracket 348 will prevent longitudinal movement of the shaft 334 and the shaft will slide in the bearings 336 and 338. A dial 350, graduated to provide adjustment for treating soles of shoes of different sizes, is formed on the front flange of the wheel 342 which engages the bracket 348 and registers under a pointer 352 secured to the bracket. To hold the size dial and shaft 334 in adjusted position a spring pressed roll 354 is mounted in a boss 356 (Fig. 4) formed on the bottom of the carriage and is arranged to enter a series of cavities 358 formed on the rear face of the worm 332. With the construction outlined above an adjustment of the hand wheel 342 to a specific size graduation on the dial 350 will set the heel gage for positioning soles of the particular size indicated on the dial. The heel gage 34 has a tongue and groove connection with the upper face of the slide block 144 and is arranged to be adjusted on the slide block by means of a slot 360 and thumb screw 362 to vary the position of the heel gage for positioning blanks of a larger size than the size of the sole to be made from the blank.

Since the length of the shank varies for soles of different sizes of shoes the movement of the matrix sleeves relatively to the die roll is varied for treating soles of different sizes of shoes. The size adjustment of the sleeve moving mechanism is made simultaneously with the adjustment of the heel gage. To this end an adjusting cylinder 364 (Figs. 4 and 9) is splined on the adjusting shaft 328 and has a spiral groove 366 arranged to receive a pin 368 projecting from the upper face of a block 370 (Fig. 8). The block 370 is pinned on a shaft 372 which is slidably mounted between opposite sides of the carriage 36 and a connecting block 374 is secured to the end of the shaft which projects out on the right hand side of the carriage (Figs. 3 and 9). The block 374 is connected to an arm 376 of a bell crank lever 376—378 which is pivoted to a boss 380 formed on the side of the frame. The connection of the arm 376 with the block 374 consists of a slot 382 formed in the lower face of the block to receive a pin 384 in the upper face of the arm 376 which permits the block to be moved with the carriage 36, relatively to the arm 376 without affecting the position of the lever. A pair of guides 386 are formed near the end of the bell crank arm 378 between which is mounted a slide block 388. The slide block is held in position in the guides by means of a hand lever 390 which has a pair of arms 392 and 394 which are pivoted to the upper and lower faces respectively of the bell crank arm 378 and have pins 396 and 398 projecting into holes in the slide 388 (Fig. 7). The slide 388 has an adjustable connection with the cam lever 272 to permit the cam lever to be moved up and down with the die roll bearing 58 during the various adjustments of the die roll for operating on different thicknesses of soles. This adjustable connection consists of a strut 400 which makes a ball and socket joint with the cam lever and slide block respectively, and is held in position by means of a tension spring 402 which is connected between pins mounted in the end of the cam lever and the lower face of the slide block. With the construction outlined above a rotation of the size adjusting hand wheel 342 will rotate the adjusting cylinder 364 and move the shaft 372 and bell crank lever 376—378 to position the cam lever 272 for operating on different sizes of soles. To correct the position of the cam lever for treating soles of different heel styles of shoes, the slide 388 on the bell crank lever 376—378 is arranged to be adjusted by the hand lever 390. The hand lever moves over a dial plate 404 (Fig. 9) formed on the outer end of the arm 378 which is provided with perforations 406 to receive a locking pin 408. The perforations 406 designate the positions for locking the hand lever to set the cam lever 272 for treating soles of shoes which have short, regular and long heels.

The positions of the heel gage 34 and the matrix moving cam 272 are arranged to be simultaneously corrected for treating soles of different styles of shoes. To correct these positions the cylinders 326 and 364 (Fig. 9) are shifted longitudinally of the shaft 328 to longitudinally shift the shafts 320 and 372 respectively for moving the heel gages 34 and cam lever 272. To shift the cylinders 326 and 364, levers 410 and 412 (Figs. 4 and 9) are pinned transversely on shafts 414 and 416 and have upper yoke ends provided with pins 418 and 420 which enter annular grooves 422 and 424 formed respectively in the surface of the cylinders 326 and 364. The shafts 414 and 416 are journaled between the front and rear walls of the carriage 36 and on the rear ends of the shafts are pinned respectively style levers 426 and 428 (Fig. 8). The lever 426 is arranged to engage a screw of a set of style screws 430 and the lever 428 is arranged to engage a screw of a set of style screws 432. To hold the levers 426 and 428 in engagement with the style screws, a tension spring 433 is connected between downwardly extending arms formed on the levers 410 and 412. The style screws are mounted in the surface of a style wheel 434 which is fixed to a shaft 436 journaled in bearings 438 formed on the carriage 36. The style screws 430 serve to correct the position of the heel gage and the style screws 432 serve to correct the position of the cam lever 272, the action of the screws for correcting the position of the heel gage and cam lever depending upon the extent of projection of the screws from the cylindrical surface of the style wheel 434 (Fig. 4). To position the style wheel for treating soles of different styles of shoes a hand wheel 440 is pinned to the outer end of the shaft 436 and has a series of graduations to indicate the adjustment for different styles formed on the edge of a cylindrical flange 437 which move under a pointer 442 mounted on the carriage 36. The hand wheel 440 is normally locked in adjusted position by means of a spring pressed plunger 444 (Figs. 7 and 8) which is mounted on the side of the carriage below the hand wheel and enters one of a series of depressions 446 formed on the face of the flange 437. The plunger 444 is normally held in a depression 446 by means of a cylindrical hub formed on a hand lever 448 which is secured to the end of a shaft 450 journaled between opposite sides of the carriage 36. To release the plunger 444 from the hand wheel 440, the hand lever 448 is rotated until a shoulder 452 thereon (Fig. 5) engages a shoulder 454 formed on the side of the carriage 36, at which time an opening 456 in the hub of the hand lever comes opposite the end of the plunger 444 and allows the plunger to be depressed as the hand wheel is rotated. When the hand lever 448 is rotated into the position for releasing the hand wheel a pair of cams 458 (Fig. 8) pinned on the shaft 450 are arranged to move into contact with outwardly extending arms 460 and 462 formed on the style levers 426 and 428 respectively to withdraw the levers 426 and 428 from contact with the style screws to release the style wheel for rotation. After the style wheel has been adjusted to the desired position the hand lever 448 is rotated to lock the hand wheel 440 in position and to permit the style levers 426 and 428 to come into contact with the style screws 430 and 432. When the style levers 426 and 428 move into contact with the adjusting screws the adjusting cylinders 326 and 364 will be shifted on the shaft 328 to correct the position of the heel gage and the cam lever 272.

The matrix sleeves 42 and 44 are movable longitudinally of the die roll to position the matrices 50 for operating on soles of shoes of different widths or to vary the width of the skiving on a particular type of sole. The matrix sleeves 42 are adjusted on the shaft by means of a pair of adjusting arms 464 (Figs. 2, 3, 6 and 8) and the matrix sleeves 44 are adjusted on the die roll by a pair of adjusting arms 466. The adjusting arms 464 and 466 are mounted on an adjusting shaft 468 and their forward ends are slidingly mounted in annular grooves 470 formed near the ends of the sleeves 42 and 44. The shaft 468 is journaled in brackets 472 which are secured to the upper face of the carriage 36 so that the adjusting arms move across the matrix sleeves when the carriage is oscillated to feed a sole. The adjusting arms for each set of matrix sleeves are threaded on cylindrical sleeves 474 and 476 which are splined on the shaft 468 (Fig. 4). The sleeves 474 are provided with a right hand thread, and the sleeves 476 are provided with a left hand thread and when the shaft is rotated in one direction or the other the adjusting arms will be moved toward and from one another or vice versa. The forward ends of the arms 464 and 466 are held in engagement with the grooves 470 on the sleeves by means of spring pressed plungers 478 (Fig. 4) which are mounted in upwardly projecting lugs 480 formed on the arms and bear against a flat face on a rectangular bar 482 which is connected between the brackets 472. By an upward pressure on the arms the plungers 478 may be depressed in the lugs 480 so as to pass under the rod 482 and hold the arms in elevated position. When the arms are elevated the sleeves are free to slide longitudinally of the die roll so that they may be removed or changed.

To adjust that shaft 468 to vary the position of the matrix sleeves a sprocket 484 is mounted on the left hand end of the shaft 468 (Fig. 3) and connected by means of a sprocket chain 486 (Fig. 1) with a sprocket 488 (Figs. 1, 10 and 11) fixed on the end of a hand wheel 490 which is loosely mounted on the size adjusting shaft 328. The hand wheel 490 is arranged to be connected to the shaft 328 by means of a pin 492 which projects beyond the face of the sprocket 488 and is arranged to enter one of a series of openings 494 formed in the face of a sleeve 496 which is secured to the shaft 328. The pin 492 is normally held in an opening 494 by means of a compression spring 498 which is seated in a cavity 500 formed in the end of the hand wheel 490 and bears against a plate 502 secured to the end of the shaft 328. A set of graduations which indicate the adjustment for soles of different widths of shoes is formed on the end of the hand wheel 490 and arranged to register over a pointer 504 formed on the plate 502. When it is desired to adjust the matrix sleeves the hand wheel 490 is shifted longitudinally of the shaft 328 by compressing the spring 498, to be disconnected from the sleeve 496, and is then rotated to set the matrix sleeves for skiving a sole of a shoe of any desired width. Since, however, the width of shanks varies for soles of shoes of different sizes, the width adjusting wheel 490 is normally connected with the size adjusting shaft 328 so that the position of the matrix sleeves will be corrected through the size hand wheel 342 for treating soles of shoes of different sizes.

The leading edges of the matrices 50 are shaped to position the soles so that the starting edges of the shank cuts are located in a line extending at an angle to the line of feed. The angle normally formed by the matrices is the most acute angle required in forming the ball line of a sole for any of the different styles of shoes. To operate the die roll so that the same set of matrices may be used in forming the ball line of practically any of the different styles of shoes, the matrix sleeves are moved relatively to the sole as the skiving cuts are being started to vary the angle of the ball line. To this end a ball line cam lever 506 (Fig. 5) is pivoted to the cover plate 264 and has a cam face 508 which is arranged to engage the cam roll 260 on the segment lever 254 at the time the matrices are in position to start a skiving on the sole. When the roll 260 engages the cam 508 the matrix sleeves will be accelerated to move the matrices faster than the sole so that the angle of the ball line being formed will be more obtuse than the regular shape of the leading edge of the matrix. The lever 506 is normally held in engagement with an adjusting screw 510 by means of a tension spring 512 which is connected between the lever 506 and a pin on the plate 264. The adjusting screw 510 is threaded into a boss 514 formed on the plate 264 and has a dial 516 at its upper end. The dial 516 is graduated to indicate the adjustment for treating soles of different styles of shoes and moves across a pointer 518 attached to the boss 514.

It will be noted that the matrix sleeve moving cams 272 and 506 are mounted at different points in the path of rotation of the cam roll 260. The shifting movement of the cam 506 is arranged to take place as the leading edge of the matrix comes into position above the skiving knife and a very slight relative movement of the matrix sleeve and sole at this time will make an appreciable difference in the angle of the ball line. When it is desired to shorten the length of the shank skiving in treating soles of different sizes and styles the relative movement of the matrix on the sole is made at the time the matrix sleeve is moving in the straight portion of the shank or that portion of the shank between its center and the breast line 24 (Fig. 13).

To permit the matrix sleeves to be removed from the die roll so that different types of matrix sleeves may be employed the die roll bearing 56 is open and a bushing 520 which has a wall thickness slightly greater than the thickness of the wall of the sleeve is mounted in the bearing 56 upon the roll 46. When the machine is in operation the bushing is held in position in the bearing by means of a cover 522 (Figs. 1, 3, 6 and 8) which is formed on a hand lever 524 pivoted to the side of the machine. If at any time the machine were to be started when the bushing is not in the bearing or the roll 46 is displaced in the bearing, the machine would be damaged and a sole would be mutilated. To overcome this objection a safety device is provided to prevent operation of the machine when the roll 46, the shaft 48 and bushing 520 are not properly assembled in the bearing 56 and when the cover is not in position to hold the bushing in the bearing. To this end an arm 526 is formed on the hand lever 524 and has a hooked end 528 (Figs. 1 and 8) arranged to engage a pin 530, which forms a pivotal connection of the rod 238 with the arm 236, when the hand lever 524 is shifted to remove the bushing 520 from the bearing 56. With the hook 528 in engagement with the pin 530 the driving clutch cannot be connected by the foot treadle 244. To prevent the disconnection of the hook 528 and the pin 530 until the cover 522 is in position over the end of the bearing, a spring pressed pawl 532 (Figs. 3 and 6) is mounted in the cover which will project out and engage the end of the roll 46 to prevent the cover from going into position over the bearing if the bushing is not in the bearing. Further, if the bushing 520, roll 46 and shaft 48 do not make a plane surface across the end of the bearing the pawl 532 will prevent the cover from being moved into position over the bushing and prevent the hook 528 from being disconnected from the pin 530.

To assist the operative in positioning a sole against the heel gage as it is passed between the die and pressure rolls, a guide plate 534 (Figs. 3 and 4) is mounted above the feed carriage 36 and projects close to the bite of the die and feed rolls. The guide plate 534 is held in position by means of a pair of pins 536 which are mounted in the upper face of the carriage 36 and pass through slots 538 formed in the plate 534. To hold the guide plate from movement with the carriage a pair of pins 540 project inwardly from opposite sides of the machine frame which are engaged by a slotted flange 542 formed on each side of the plate.

While the specific embodiment of the invention has been illustrated and described as adapted for shanking out shoe soles, certain features of the invention are not limited to use in a machine for shanking out shoe soles, but may be used in other relations.

The operation of the machine has been described in connection with the description of the specific construction of the parts of the machine and a further description of the operation is believed to be unnecessary.

The preferred form of the invention having been thus described, what is claimed as new, is:

1. A shoe blank skiving machine having, in combination, a skiving knife, a pressure roll, a die roll having a matrix, means to rotate said rolls to feed a blank against the skiving knife, and means to relatively move the blank and matrix in the direction of feed during the skiving operation.

2. A shoe blank skiving machine having, in combination, a skiving knife, a die roll, a pressure roll, means to rotate the rolls to advance a blank against the skiving knife, and means to accelerate the rotation of one of said rolls relatively to the other during the skiving operation.

3. A shoe blank skiving machine having, in combination, a skiving knife, a die roll, a pressure roll, means to rotate the rolls to advance a blank against the skiving knife, and means to accelerate the rotation of the die roll relatively to the pressure roll during the skiving operation.

4. A shoe blank skiving machine having, in combination, a skiving knife, a pressure roll, a die roll having a matrix, means to rotate said rolls to feed a blank against the skiving knife, means to relatively move the blank and matrix in the direction of feed, and means to vary said relative movement to vary the character of skiving.

5. A shoe blank skiving machine having, in combination, a skiving knife, a die roll, a pressure roll, means to rotate the rolls to advance a blank, means to accelerate one of said rolls relatively to the other, and means to vary said acceleration to vary the character of skiving.

6. A shoe blank skiving machine having, in combination, a skiving knife, a die roll, a pressure roll, means for driving the rolls, a matrix rotatably mounted on the die roll, and means for rotating the matrix relatively to the die roll.

7. A shoe blank skiving machine having, in combination, a skiving knife, a pressure roll, a die roll, a sleeve provided with a matrix rotatably mounted on the die roll, means to rotate the die and pressure rolls, and additional means for rotating the sleeve.

8. A shoe blank skiving machine having, in combination, a skiving knife, a die roll, a pressure roll, a matrix rotatably mounted on the die roll, means to rotate said rolls and matrix to skive a blank, and means to accelerate the rotation of the matrix relatively to the pressure roll during a portion of the revolution of the pressure roll to shorten the length of skiving on the blank.

9. A shoe blank skiving machine having, in combination, a skiving knife, a die roll, a pressure roll, a matrix rotatably mounted on the die roll, means to rotate the rolls and matrix in unison to feed a blank against the skiving knife, and means to relatively move the blank and matrix in the direction of feed when operating upon a predetermined portion of the blank.

10. A shoe blank skiving machine having, in combination, a skiving knife, a die roll, a pressure roll, a matrix rotatably mounted on the die roll, means to rotate the rolls and matrix in unison to feed a blank against the skiving knife, and a plurality of devices constructed and arranged to relatively move the blank and matrix in the direction of feed when skiving different portions of the blank.

11. A shoe blank skiving machine having, in combination, a skiving knife, a die roll, a pressure roll, means to rotate the rolls to feed a blank against the skiving knife, a matrix movably mounted on the die roll and shaped to position the blank to form a cut having its starting edge arranged at an angle to the line of feed, and means to relatively move the blank and matrix to change the angle of the starting edge of the cut.

12. A skiving machine for shanking out shoe soles having, in combination, a skiving knife, a die roll, a pressure roll, means to rotate the rolls to feed a blank against the skiving knife, a matrix, shaped to start the shank cuts at the ball line on each side of the center of the sole, movably mounted on the die roll, and means to move the matrix relatively to the die roll during the feeding operation to vary the angle of the ball line.

13. A skiving machine for shanking out shoe soles having, in combination, a skiving knife, a die roll, a pressure roll, a matrix movably mounted on the die roll, and means for positioning a sole and for controlling the movement of the matrix, to locate the skiving in the shank portion of the sole.

14. A shoe blank skiving machine having, in combination, a skiving knife, a pressure roll, a die roll, having a shorter circumferential length than the length of the blank to be treated, a matrix mounted on the die roll and arranged to cause a portion of the blank to be skived intermediate its ends, means to feed a blank between the rolls, and means to move the matrix to bring it into operation on a predetermined portion of the blank.

15. A machine for skiving shoe soles having, in combination, a skiving knife, a die roll, a pressure roll, a matrix rotatably mounted on the die roll, means for operating the rolls, and means for controlling the movement of the matrix to bring the matrix into position on the sole for skiving the shank portion.

16. A machine for skiving shoe soles having, in combination, a skiving knife, a pressure roll, a die roll, means for operating the rolls, and matrices mounted on the die roll for positioning right and left shoe soles to be simultaneously skived.

17. A skiving machine for shanking out shoe soles having, in combination, a skiving knife, a die roll, a pressure roll, means for operating the rolls, and a series of matrices mounted on the die roll to position separate portions of the shanks of right and left soles to be simultaneously skived.

18. A shoe blank skiving machine having, in combination, a skiving knife, a die roll, a pressure roll, a matrix movably mounted on the die roll, means to rotate the die roll and matrix in unison, means to accelerate the speed of rotation of the matrix relatively to the die roll, and means to stop rotation of the matrix after it has completed a revolution until the die roll completes a revolution.

19. A shoe blank skiving machine having, in combination, a skiving knife, a pressure roll, a die roll, a matrix rotatably mounted on the die roll, means to rotate the matrix, and means to stop the matrix while the rolls continue to rotate.

20. A shoe blank skiving machine having, in combination, a skiving knife, a pressure roll, a die roll, a matrix movably mounted on the die roll, means to accelerate the rotation of the matrix relatively to the die roll, and means to stop the die roll and matrix when each has made a complete revolution.

21. A shoe blank skiving machine having, in combination, a skiving knife, a pressure roll, a die roll, a matrix rotatably mounted on the die roll, means to rotate the rolls, means to rotate the matrix relatively to the die roll, and means to stop the matrix in a predetermined position irrespective of the extent of said relative movement.

22. A shoe blank skiving machine having, in combination, a skiving knife, a pressure roll, a die roll provided with a matrix for operating on a portion of a blank intermediate its ends and with a cavity, means to rotate the rolls, means to stop the rolls with the cavity in position to open a space between the die and pressure rolls, and means to position the blank with relation to said matrix whereby a blank may be positioned between the rolls with a predetermined portion of the blank in position to be acted upon by said matrix.

23. A shoe blank skiving machine having, in combination, a skiving knife, a pressure roll, a die roll having less circumferential length than the length of the blank to be treated, and having a matrix to operate on a portion of the blank intermediate its ends, and a cavity extending from one edge of the matrix, means to rotate the rolls, means to stop the rolls with the cavity opposite the pressure roll, and means to position a sole in a predetermined position with relation to said matrix.

24. A shoe blank skiving machine having, in combination, a skiving knife, a pressure roll, a die roll, a sleeve movably mounted on the die roll and having a matrix and a cavity, means to rotate the rolls to feed a blank, means to move the sleeve relatively to the die roll, and means to stop the sleeve in a predetermined position irrespective of said relative movement to bring the cavity opposite the pressure roll.

25. The combination with the skiving knife and feed roll in a skiving machine, of a die roll comprising a shaft, a roll mounted on the shaft, a matrix sleeve mounted on the roll, connections between the shaft and sleeve, and connections between the roll and shaft by which the sleeve may be rotated relatively to the roll.

26. The combination with the skiving knife and feed roll in a skiving machine, of a die roll comprising a shaft, a roll mounted on the shaft, a matrix sleeve mounted on the roll, means for locking the shaft to said sleeve, a connection between said shaft and said roll, and mechanism for rotating the said roll relatively to said shaft.

27. The combination with the skiving knife and feed roll in a skiving machine, of a die roll comprising a shaft, a roll mounted on the shaft, a matrix sleeve mounted on the roll, means for locking the shaft to said sleeve, a connection between said shaft and said roll, mechanism for rotating the roll relatively to said shaft, and means for holding said sleeve in its rotated position.

28. The combination with the skiving knife and feed roll in a skiving machine, of a die roll comprising a shaft, a roll mounted on the shaft, a matrix sleeve mounted on the roll, connections between the shaft and the sleeve, a connection between said shaft and said roll, means for holding said shaft and roll for movement in unison, mechanism for rotating said roll relatively to said shaft, and means for locking said sleeve in its rotated position whereby said sleeve and shaft will rotate in unison at the completion of the relative movement.

29. The combination with the skiving knife and feed roll in a skiving machine, of a die roll comprising a shaft, a roll mounted on the shaft, a gear secured to the shaft, a matrix sleeve mounted on the roll, means for locking the shaft to the sleeve, a gear connected to the roll, a segment lever mounted on the roll gear and articulating with the gear on the shaft, and a cam for operating said lever to move the sleeve relatively to the roll.

30. The combination with the skiving knife and feed roll in a skiving machine, of a die roll comprising a shaft, a roll mounted on the shaft, a gear on the shaft, a matrix sleeve mounted on the roll, means for locking the sleeve to the shaft, a gear mounted on the roll, a segment lever mounted on the roll gear and articulating with the gear on the shaft, a cam to operate said lever, and means to control the cam to vary the relative movement of the sleeve and roll.

31. The combination with the skiving knife and feed roll in a skiving machine, of a die roll comprising a shaft, a roll mounted on the shaft, a gear on the shaft, a matrix sleeve mounted on the roll, means for locking the shaft to the sleeve, a gear mounted on the roll, a segment lever mounted on the roll gear and articulating with the gear on the shaft, a spring operating on said lever to hold the sleeve in position for movement in unison with the roll, a cam to move said lever, means to lock the sleeve in its rotated position, and devices to release said locking means to permit said spring to bring the roll and sleeve into position for movement in unison.

32. A skiving machine for shanking out shoe soles having, in combination, a skiving knife, a pressure roll, a die roll, means for positioning a blank to be fed endwise to the roll, a matrix adjustably mounted on said die roll to act on the shank portion of a sole blank, and means to adjust the matrix axially of the die roll independently of the positioning means.

33. A skiving machine for shanking out shoe soles having, in combination, a skiving knife, a pressure roll, a die roll, means for positioning a blank to be fed endwise to the roll, a pair of matrices adjustably mounted on said die roll to operate on opposite sides of the shank portion of a blank, and means to adjust said matrices axially of the die roll toward and from each other independently of the positioning means.

34. A shoe blank skiving machine having, in combination, a skiving knife, a pressure roll, a die roll, a pair of matrices adjustably mounted on said die roll to operate on opposite sides of a blank, and means under the control of the operator for adjusting said matrices simultaneously toward and from each other axially of the die roll.

35. A skiving machine for shanking out shoe soles having, in combination, a skiving knife, a pressure roll, a die roll, a pair of matrices adjustably mounted on said die roll to operate on opposite sides of the shank portion of a blank, an end gage for positioning the blank with relation to the matrices, devices for simultaneously adjusting the end gage and adjusting the matrices toward and from each other axially of the die roll, and additional means for adjusting the matrices toward and from each other axially of the die roll.

36. A shoe blank skiving machine having, in combination, a skiving knife, a pressure roll, a die roll, a pair of matrix sleeves mounted to slide axially of the die roll, a pair of positioning arms mounted on the machine frame and arranged to engage the sleeves, and means under the control of the operator to simultaneously adjust the arms toward and from one another to vary the position of the sleeves.

37. A shoe blank skiving machine having, in combination, a skiving knife, a pressure roll, a die roll, a plurality of pairs of matrix sleeves adjustably mounted on the die roll, each pair being arranged for operating on opposite sides of a blank, adjusting means connected with each matrix sleeve, and means to simultaneously adjust each pair of sleeves toward and from one another to vary their position for operating on blanks of different widths.

38. A machine for skiving shoe soles having, in combination, a skiving knife, a pressure roll, a die roll, a matrix mounted on the roll, means to rotate the rolls to feed a sole, means to relatively move the sole and matrix to position the skiving, and an adjusting means graduated to provide for different sizes of soles to vary said relative movement in accordance with the size of the sole to be treated.

39. A machine for skiving shoe soles having, in combination, a skiving knife, a pressure roll, a die roll, a matrix mounted on the die roll, means to rotate the roll to feed a sole, means to relatively move the sole and matrix to position the skiving, and an adjusting means graduated to provide for different styles of soles to vary said relative movement in accordance with the style of sole to be treated.

40. A machine for skiving shoe soles having, in combination, a skiving knife, a pressure roll, a die roll, a matrix mounted on the die roll, means to rotate the rolls to feed a sole, means to relatively move the sole and matrix to position the skiving, and an adjusting means graduated to provide for different styles of heels to vary said relative movement in accordance with the style of the heel of the sole to be treated.

41. A machine for skiving shoe soles having, in combination, a skiving knife, a pressure roll, a die roll, a matrix mounted on the die roll, means to rotate the rolls to feed a sole, means to relatively move the sole and matrix to position the skiving, and adjusting means to provide for different sizes of soles and to provide for different styles of heels to vary said relative movement in accordance with the size of the sole and the style of the heel of the sole to be treated.

42. A machine for skiving shoe soles having, in combination, a skiving knife, a pressure roll, a die roll, a matrix mounted on the die roll, means to rotate the rolls to feed a sole, means to relatively move the sole and matrix to position the skiving, and adjusting means graduated to provide for sizes of soles and to provide for the different styles of soles to vary said relative movement in accordance with the size and style of the sole to be treated.

43. A machine for skiving shoe soles having, in combination, a skiving knife, a pressure roll, a die roll, a matrix mounted on the die roll, means to rotate the rolls to feed a sole, means to relatively move the sole and matrix to position the skiving, and adjusting means graduated to provide for different styles of soles and to provide for different styles of heels to vary said relative movement in accordance with the style of the sole and style of the heel of the sole to be treated.

44. A machine for skiving shoe soles having, in combination, a skiving knife, a pressure roll, a die roll, a matrix mounted on the roll, means to rotate the rolls to feed a sole, means to relatively move the sole and matrix to position the skiving, and an adjusting means graduated to provide for different sizes of soles to provide for different styles of soles and to provide for different styles of heels to vary said relative movement in accordance with the size and style of the sole and the style of the heel of the sole to be treated.

45. A machine for skiving shoe soles having, in combination, a skiving knife, a pressure roll, a die roll, a matrix adjustable axially of the die roll, means to rotate the rolls to feed a sole, means to relatively move the sole and matrix to position the skiving, and an adjusting means graduated to provide for different sizes of soles to vary said relative movement and to adjust said matrix axially of the die roll to vary the width of skiving in accordance with the size of the sole to be treated.

46. A machine for skiving shoe soles having, in combination, a skiving knife, a pressure roll, a die roll, a pair of matrices adjustable axially of the die roll, means to rotate the rolls to feed a sole, means to relatively move the sole and matrices to position the skivings, and an adjusting means graduated to provide for different sizes of soles to vary said relative movement and to adjust said matrices axially of the roll in accordance with the size of the sole to be treated.

47. A machine for skiving shoe soles having, in combination, a skiving knife, a pressure roll, a die roll, a matrix adjustable axially of the die roll, means to rotate the rolls to feed a sole, mechanism to relatively move the matrix circumferentially with relation to the die roll, an end gage to position the sole with relation to the matrix, and an adjusting means to simultaneously vary the position of the end gage, the setting of the matrix moving mechanism and the axial position of the matrix on the die roll to skive different sizes of soles.

48. A skiving machine for shanking out shoe soles, having in combination, a pressure roll, a die roll less in circumference than the length of the sole blank, a matrix mounted on the die roll and means for causing the matrix to act upon the shank portion of the blank as the blank is fed endwise between the rolls.

49. A machine for skiving shoe soles having, in combination, a skiving knife, a pressure roll, a die roll, having a matrix, means to rotate the rolls, a blank carriage, means on the carriage to position the blank in a predetermined relation to the matrix, said rolls being normally separated a distance greater than the thickness of the blank to permit a blank to be passed between them to be positioned on the carriage, and means to advance said carriage at approximately the speed of rotation of the rolls to move the sole as it comes into contact with said matrix.

50. A shoe blank skiving machine having, in combination, a skiving knife, a pressure roll, a die roll having a matrix, said rolls being normally separated a distance greater than the thickness of the blank to permit a blank to be passed between them, and gages mounted on each side of the rolls to hold the blank in position to be skived.

51. A shoe blank skiving machine having, in combination, a skiving knife, a pressure roll, a die roll having a matrix, said rolls being normally separated a distance greater than the thickness of the blank to permit a blank to be passed between them, gages mounted on each side of the rolls to longitudinally and transversely position the blank with relation to the matrix, and means for causing the gages to guide the sole while it is being skived.

52. A machine for skiving shoe soles having, in combination, a skiving knife, a pressure roll, a die roll having a matrix constructed for skiving the shank portion of the sole, a heel gage, and an adjusting means graduated to provide for different sizes of soles connected with the heel gage to position the sole to bring the ball line into register with the leading end of the matrix.

53. A shoe blank skiving machine having, in combination, a skiving knife, a pressure roll, a die roll having a matrix, an end gage, and an adjusting means graduated to provide for different sizes of blanks and to provide for different styles of blanks connected with the end gage to vary the position of the end gage with relation to the matrix in accordance with the size and style of blank to be treated.

54. A shoe blank skiving machine having, in combination, a skiving knife, a pressure roll, a die roll having a matrix to which the blank is fed endwise, an end gage to position different kinds of blanks with relation to the matrix, means to rotate the rolls to feed a blank, mechanism to relatively move the blank and the matrix to vary the character of skiving, and means to simultaneously adjust said end gage and said mechanism.

55. A machine for skiving shoe soles having, in combination, a skiving knife, a pressure roll, a die roll, a matrix movably mounted on the die roll, an end gage, means to rotate the rolls to feed a sole, mechanism to move the matrix relatively to the die roll during the skiving operation, and an adjusting means graduated to provide for different sizes of soles to simultaneously position the end gage and set the matrix moving mechanism in accordance with the size of the sole to be skived.

56. A machine for skiving shoe soles having, in combination, a skiving knife, a pressure roll, a die roll, a matrix movably mounted on the die roll, an end gage for positioning the sole, means to rotate the rolls to feed a sole, mechanism to move the matrix relatively to the die roll during the skiving operation, and an adjusting means graduated to provide for different sizes of soles and to provide for different styles of soles to simultaneously vary the position of the end gage and set the matrix moving mechanism in accordance with the different size of the different style of the soles to be skived.

57. A machine for skiving shoe soles having, in combination, a skiving knife, a pressure roll, a die roll, a gage having elongated faces for engaging opposite edges of a sole, means to hold said faces in parallel relation, means for coördinately adjusting said faces to transversely position a sole, and means to lock the gage in adjusted position whereby it will guide the sole during the skiving operation.

58. A machine for skiving shoe soles having, in combination, a skiving knife, a pressure roll, a die roll, a gage having elongated faces for engaging opposite edges of a sole, means to hold said faces in parallel relation, means for adjusting said faces toward and from each other in unison, means to lock the gage in adjusted position, and devices to release said locking means to free the gage for positioning a new sole.

59. A machine for skiving shoe soles having, in combination, a skiving knife, a pressure roll, a die roll, a matrix sleeve mounted on the die roll, an open bearing for one end of the die roll, a removable bushing mounted in the bearing on the die roll, and means for holding said bushing in position arranged to prevent operation of the machine when the parts are not assembled in the bearing.

60. A machine for skiving shoe soles having, in combination, a skiving knife, a pressure roll, a die roll, a matrix sleeve mounted on the die roll, a bearing for one end of the die roll, a bushing mounted in the bearing on the die roll removable to permit removal of the sleeve, clutch operated means for driving the rolls, and means for holding said bushing in position arranged to prevent operation of the clutch when the bushing is not properly assembled in the bearing.

61. A machine for skiving shoe soles having, in combination, a skiving knife, a pressure roll, a die roll, a shaft for the die roll, a matrix on the die roll, an open bearing for one end of the die roll, a shaft, and means to prevent operation of the rolls when the die roll and shaft are not properly assembled in the bearing.

62. A machine for skiving shoe soles having, in combination, a skiving knife, a pressure roll, a die roll, a shaft for the die roll, a matrix sleeve mounted on the die roll, an open bearing for one end of the die roll, a removable bushing mounted in said bearing on the die roll, a cover to hold the bushing in said bearing, clutch operated means for driving the rolls, a latch connected with said cover, and arranged to engage the operating means of the clutch when the cover is removed from the bearing, and means to prevent a disconnection of the latch from the clutch operating means when any or all of the parts are not properly assembled in the bearing.

63. A machine for skiving shoe soles having, in combination, a skiving knife, a pressure roll, a die roll, a matrix rotatably mounted on the die roll, means to rotate the rolls to feed a sole against the skiving knife, mechanism to relatively move the blank and matrix during the skiving operation, an end gage for positioning the sole with relation to the matrix, and devices for simultaneously adjusting the end gage and the matrix moving mechanism to skive different kinds of soles.

64. A shoe blank skiving machine, having in combination, a skiving knife, a pressure device, a matrix carrier having a matrix and means to relatively move the blank and matrix during the skiving operation.

65. A shoe blank skiving machine, having in combination, a skiving knife, a pressure device, a matrix carrier having a matrix, means to relatively move the blank and matrix and means to vary said relative movement to vary the character of the skiving.

66. A skiving machine for shanking out shoe soles, having in combination, a skiving knife, a pressure roll, a die roll provided with a matrix shaped to start the shank cuts at the ball line on each side of the center of the sole and means for relatively moving the sole blank and matrix during the passage of the blank between the rolls to vary the angle of the ball line.

67. A machine for operating upon soles having, in combination, a sole support, means for laterally centering the heel part of a sole placed on the support, and self-adjusting gages comprising elongated parallel plates engaging opposite edges of the sole for laterally centering the widest portion of the forepart of the sole.

68. A machine for operating upon soles having, in combination, a sole support, means for laterally centering the heel part of a sole placed on the support, a pair of self-adjusting gages for laterally contering the widest portion of the forepart of a sole, and means for locking said gages in the position which they assume upon the completion of such gaging of the forepart of the sole.

69. A machine for operating upon soles having, in combination, a sole support over which the sole is moved into position to be operated upon, operating instrumentalities, and means for positioning a sole on the support comprising a pair of gages for engaging opposite edges of the sole, a pair of pivotally mounted arms carrying the gages that extend from their pivots in the direction that the work is moved by the operator to the operating instrumentalities, means for yieldingly urging the gages toward each other, and connections between the gages to cause the gages to move in unison.

70. A machine for operating upon soles having, in combination, a sole support, sole centering gages having elongated faces to engage opposite edges of a sole, pivotally mounted arms upon which said gages are mounted, and means for holding said gages with their faces in parallel relation in all positions of said arms.

WILLIAM C. STEWART.